Dec. 19, 1967 R. L. BERRY 3,358,722
REVERSE TAPER BORING TOOL
Filed July 5, 1966 2 Sheets-Sheet 1
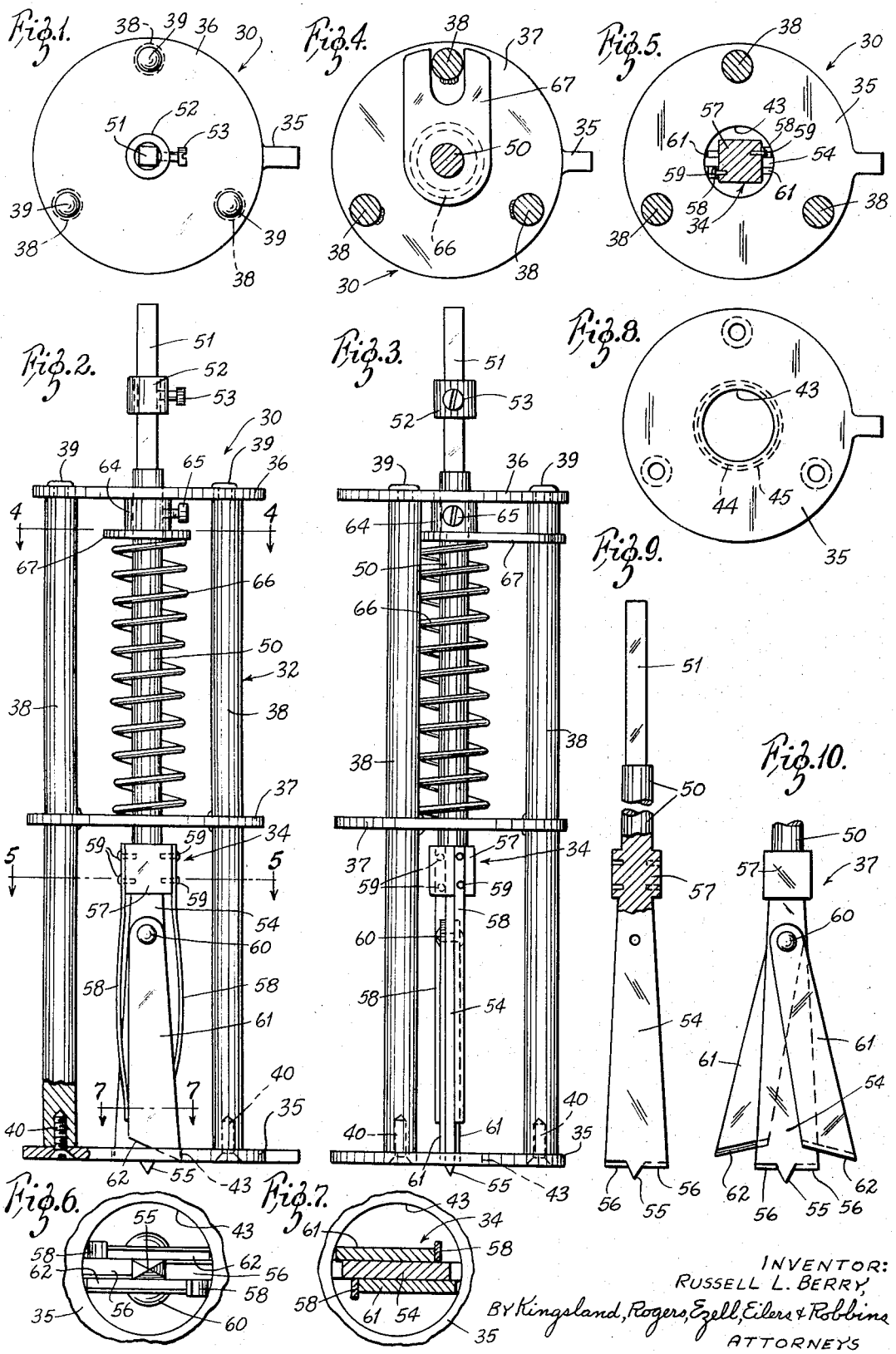
INVENTOR:
RUSSELL L. BERRY,
BY Kingsland, Rogers, Ezell, Eilers & Robbins
ATTORNEYS

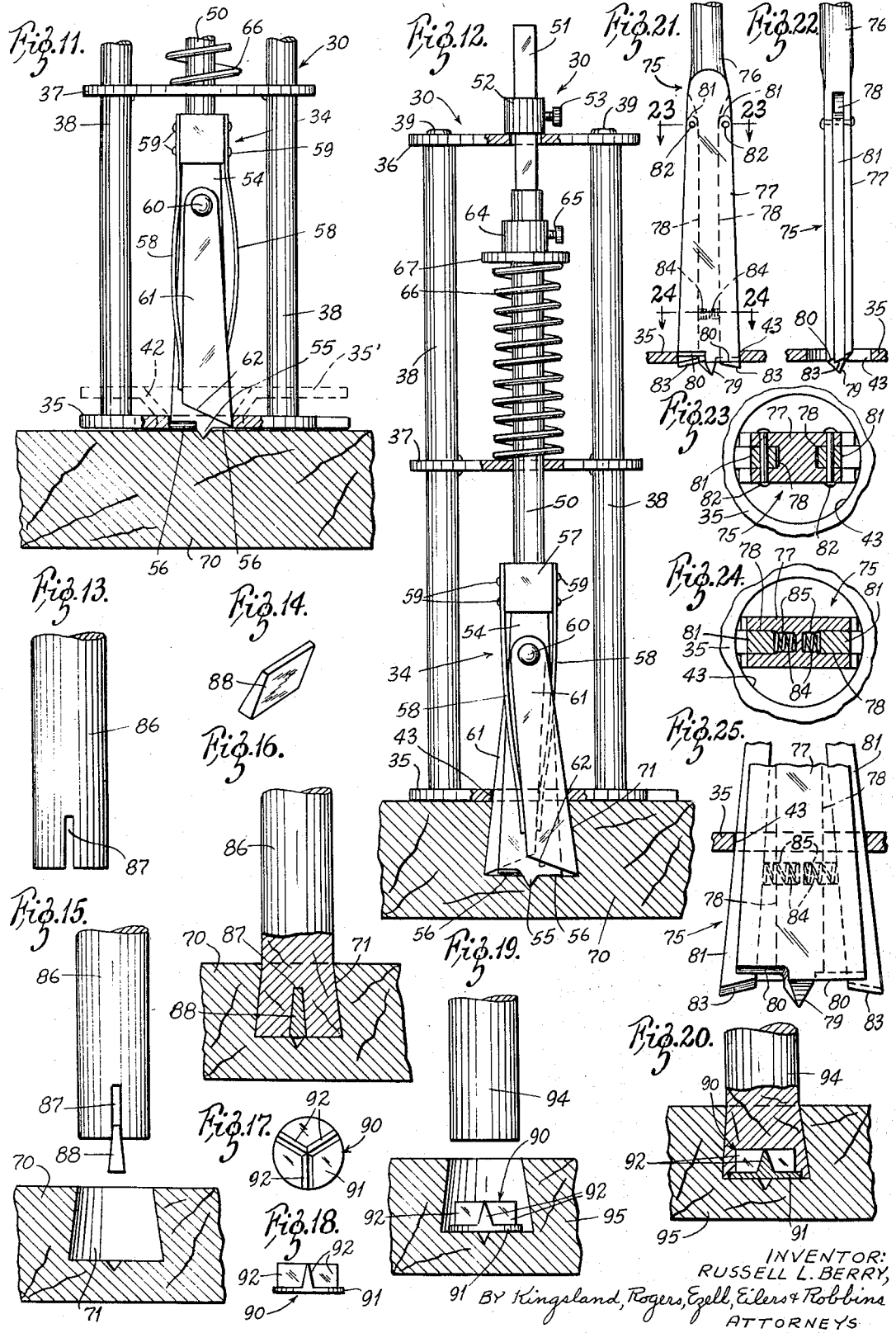

United States Patent Office 3,358,722
Patented Dec. 19, 1967

1

3,358,722
REVERSE TAPER BORING TOOL
Russell L. Berry, P.O. Box 428,
Mansfield, Mo. 65704
Filed July 5, 1966, Ser. No. 562,895
6 Claims. (Cl. 145—124)

The present application relates generally to the tool art, and more particularly to a novel tool for boring holes having interior diameters greater than the entrance diameter.

There has long been the need for an effective tool for rapidly and accurately boring holes having internal diameters greater than the diameter at the entrance. Such holes are useful to form doweling joints in furniture, and the like. Many other uses exist.

Therefore, an object of the present invention is to provide a novel bit unit meeting the requirements of the aforesaid long-felt need.

In brief, a preferred exemplification of the present novel bit unit includes a bit assembly having a shaft adapted to receive a power drill or manually operated brace at one end and having cutting blades at the other. The bit assembly is mounted in a support which also receives a guide for the blades determining bored diameters. Means are provided for maintaining the bit in and returning it to a starting position. Also provided for use in connection with the bored hole are novel dowel expanding elements.

Therefore, other objects of the present invention are to provide a bit unit of the kind referred to, which can be employed to swiftly and accurately bore holes having interior diameters greater than the diameter at the entrance of the hole, which can be readily employed with minimum intsruction, which is adapted for long effective use, which involves low maintenance costs, which is adapted to bore holes of different sizes, and which is otherwise constructed to fulfill the objects and advantages sought therefor.

The foregoing and other objects and advantages are apparent from the following description taken with the accompanying drawings, in which:

FIGURE 1 is a top plan view of a bit unit incorporating the principles of the present invention;

FIGURE 2 is a side elevational view thereof, a portion being in cross section for illustration of a detail;

FIGURE 3 is a side elevational view thereof rotated ninety degrees clockwise;

FIGURES 4 and 5 are transverse cross-sectional views taken on substantally the lines 4—4 and 5—5, respectively, of FIGURE 2;

FIGURE 6 is an enlarged bottom view of the cutting edges of the blades;

FIGURE 7 is an enlarged transverse cross-sectional view taken on substantially the line 7—7 of FIGURE 2;

FIGURE 8 is a view of the bottom plate;

FIGURE 9 is a side elevational view of the central or main blade, parts being in section for illustration of detail and a portion broken away for conservation of space;

FIGURE 10 is a view of the lower part of the main blade and pivotally attached blades of the bit assembly, the latter being in spread relation, the leaf springs being omitted;

FIGURE 11 is a side elevational view of the lower part of the bit unit disposed on a piece of wood, a portion being in cross section for illustration of detail;

FIGURE 12 is a side elevational view of the bit unit with the blades in cutting positions at the bottom of a hole, the piece of wood and portions of the bit unit being in cross section for better illustration of detail;

FIGURE 13 is a view of a slotted end of a dowel;

FIGURE 14 is an isometric view of a wedge for insertion in the slot of the dowel of FIGURE 13;

2

FIGURE 15 is a view showing the wedge of FIGURE 14 entering the slot of the dowel;

FIGURE 16 illustrates the slotted end of the dowel expanded by the wedge and within a hole bored by the present bit unit;

FIGURE 17 is a top plan view of a modified wedge;

FIGURE 18 is a side elevational view thereof;

FIGURES 19 and 20 illustrate the use of the modified wedge with an end of a dowel;

FIGURE 21 is a side elevational view of the lower portion of a modified bit assembly;

FIGURE 22 is an end elevation thereof;

FIGURES 23 and 24 are enlarged transverse cross-sectional views taken on substantially the lines 23—23 and 24—24, respectively, of FIGURE 21; and FIGURE 25 is an enlarged view of the lower end of the bit of FIGURES 21-24 in expanded positions.

Referring to the drawings more particularly by reference numerals, 30 indicates generally a bit unit incorporating principles of the present invention. The bit unit 30 includes a support 32, a bit assembly 34, and a guide plate 35.

The support 32 includes two spaced annular plates 36 and 37. Three posts 38 extend through equi-spaced openings in the plate 37 and are welded in secured relation therewith. The posts 38 have reduced upper ends which extend through suitable openings in the plate 36, being peened over as at 39 to establish a secure relation. Secured to the bottom ends of the posts 38 by suitable screws 40 is the hole-sizing guide plate 35. The plate 35 has a central annular opening 43, larger sizes being suggested by the dotted lines 44 and 45 (FIG. 8). The plate 35 can be quickly removed and replaced with another plate of different diameter hole 43, as required.

Other types of plates 35 and other means for mounting the same at the lower end of the support 32 may be employed. For example, in FIGURE 11 a modified plate 35' is illustrated in dotted lines, being cone-shaped at 42 to facilitate boring at an angle.

The bit assembly 34 includes a shaft 50 which may be reduced to a desired diameter at 51 to receive a stop collar 52 maintained in selected position by a setscrew 53. At the lower end of the shaft 50 integral therewith is a flat blade 54 having a point 55 and opposed cutting edges 56. Above the blade 54 is an integral square portion 57 having threaded apertures by means of which leaf springs 58 are mounted in position by the use of suitable screws 59. Pivotally mounted on opposite sides of the blade 54 by means of a brad 60, or the like, are blades 61, each of which has a cutting edge 62.

Referring to FIGURES 2 and 3, a collar 64 is secured to the shaft 50 below the plate 36 by means of a setscrew 65 to establish the upper limit of movement of the bit assembly 34 in respect to the support 32. A compression spring 66 surrounds the shaft 50, bearing at its upper end against a suitable washer 67 abutting the collar 64 and at its lower end against the plate 37 to return the bit assembly to the position of FIGURES 2 and 3 after relative downward movement thereof in operative or other use of the bit unit. It will be noted that the blades 61 engage the wall of the opening 43 under the influence of the leaf springs 58 which constantly bias the blades 61 in the directions clearly shown in the drawings.

The upper end 51 of the shaft 50 is adapted to be inserted in the power drill or a manually operated brace. In using the bit unit 30, it is placed on a wood piece 70, or the like, as shown in FIGURE 11 and forced downwardly as the blades 54 and 61 are rotated manually or under power until the position of FIGURE 12 is reached, which is determined by the position of the collar 52. Upon release of the downward pressure, a bit assembly 34 will rise to the position of FIGURE 11 under the influence of the spring 66 leaving a hole 71 as shown in FIGURES 12, 15 and 19. It is clear that the blades 61 move outwardly under the influence of the leaf springs 58 as the bit unit 34 descends in the boring action, the pitch of the hole and the size being determined by the opening 43 in the plate 42.

In FIGURES 21–25, there is illustrated a modified form of the bit assembly generally designated 75. The bit assembly 75 includes a shaft 76 similar to the shaft 50 above the square portion 57. An integral blade 77 has side slots 78 therein, as is shown in the drawings, a point 79 and cutting edges 80. Wing blades 81 are mounted on pivot pins 82 and are disposed in the slots 78, each having a cutting edge 83. The wing blades 81 are biased outwardly by small compression spring 84 disposed in opposed openings 85 formed through the web between the channels 78 (FIGS. 24, 25).

The present invention is particularly adapted for boring holes like holes 71 for the firm and non-removable reception of one end of a dowel 86, or the like. The dowel 86 has a slot 87 which receives a suitable wedge 88. The firm expanded relationship of the end of the dowel 86 and the hole 71 is illustrated in FIGURE 16.

A modified wedge 90 is illustrated in FIGURES 17–20 and includes a base 91 and three sharp walls or flanges 92. The wedge 90 is disposed in the bore or hole 71 as shown in FIGURE 18. Thereafter, the dowel 94 is driven against the wedge 90, thereby expanding the end of the dowel into firm non-removable relationship with the member 95, which may be the leg or seat of a chair, or other member.

It will be understood that the use of the modified bit assembly illustrated in FIGURES 21–25 is the same as that of the bit assembly 34.

It is apparent that there have been provided novel structures adapted to fulfill the objects and advantages sought therefor.

It is to be understood that the foregoing description and the accompanying drawings have been given by way of illustration and example. It is also to be understood that changes in form of the elements, rearrangement of parts, and substitution of equivalent elements, which will be obvious to those skilled in the art, are contemplated as within the scope of the present invention which is limited only by the claims which follow.

What is claimed is:
1. A bit assembly comprising in combination:
a shaft;
a stationary blade at one end of said shaft terminating in a cutting edge; a pair of movable blades pivotally mounted on said stationary blade and each terminating in a cutting edge;
means on said shaft biasing the terminal ends of said movable blades laterally away from the terminal end of said stationary blade;
support means mounting said shaft for reciprocal movement therein; and means removably mounted on said support means limiting the expansive movement of said movable blades as the bit assembly is moved downwardly so as to drill a hole having internal diameters greater than that at the hole entrance.
2. The combination of claim 1 and including means biasing said drill assembly to rest position.
3. The combination of claim 1 in which said blades have overlapping cutting edges.
4. The combination of claim 1 in which said pivoted blades are disposed one at each side of said stationary blade.
5. The combination of claim 1 in which said stationary blade has side grooves and in which said pivoted blades are mounted in said grooves.
6. The combination of claim 1 in which said limiting means is replaceable with limiting means of different effectiveness.

References Cited
UNITED STATES PATENTS

| 7,589 | 8/1850 | Dancourt | 145—124 |
| 521,430 | 6/1894 | Bourgeous | 145—124 |
| 529,049 | 11/1894 | Rich et al. | 145—124 |
| 581,677 | 4/1897 | Lee | 145—124 |
| 845,360 | 2/1907 | Jungling | 145—124 |
| 2,818,753 | 1/1958 | Leggett | 145—114.5 X |

FOREIGN PATENTS

| 178,620 | 4/1922 | Great Britain. |

OTHELL M. SIMPSON, *Primary Examiner.*

P. V. PARKER, JR., *Assistant Examiner.*